United States Patent [19]

Thijssen et al.

[11] Patent Number: 5,082,727
[45] Date of Patent: Jan. 21, 1992

[54] FLAMEPROOF PRODUCT

[75] Inventors: Stan Thijssen, Bad Hersfeld; Jürgen Laser, Kirchheim, both of Fed. Rep. of Germany

[73] Assignee: Matec Holding AG, Switzerland

[21] Appl. No.: 455,158

[22] Filed: Dec. 22, 1989

[30] Foreign Application Priority Data

Dec. 23, 1988 [CH] Switzerland ............... 4783/88

[51] Int. Cl.$^5$ ............................... B32B 5/16
[52] U.S. Cl. ..................... 428/328; 428/283; 428/288; 428/323; 428/326; 428/329; 428/920; 428/921
[58] Field of Search ............. 428/288, 283, 323, 326, 428/328, 329, 920, 921

[56] References Cited

U.S. PATENT DOCUMENTS 4,123,574 10/1978 Wesch et al. ............. 427/386
4,209,561 6/1980 Sawko .................... 428/921

FOREIGN PATENT DOCUMENTS 3219792 1/1983 Fed. Rep. of Germany .
60-88060 5/1985 Japan .

*Primary Examiner*—Merrell C. Cashion, Jr.
*Assistant Examiner*—Hoa T. Le
*Attorney, Agent, or Firm*—Wigman & Cohen

[57] ABSTRACT

The flameproof product contains fibre material and/or fillers and a reaction resin as binder and several flameproofing agents. The flameproofing agents are a combination of organic borates, salts of phosphoric acids and oxide hydrates of magnesium and/or of aluminum, the total amount of which in the product is 3-35% by weight. Products which contain this combination of flameproofing agents and up to 50% by weight of reaction resin are resistant to glowing combustion according to DIN 53,459 and have a subsequent glowing combustion time of less than 1 min according to Nordtest NT-Fire 002.

19 Claims, No Drawings

FLAMEPROOF PRODUCT

The invention relates to a flameproof product containing fibre material and/or fillers and a reaction resin as a binder and several flameproofing agents.

Products containing a reaction resin as a binder are used widely in industry, either as moulding materials or moulding produced therefrom or as nonwovens or webs and as laminates. For many applications, it is necessary to flameproof such products as well as possible. It is known that this can be done by rendering plastics blends flame-retardant or flameproof, for which purpose certain combinations of flameproofing agents or of inorganic fillers are used and moreover the resin content is kept below 15%, as described in, for example, DE-G 87 00 170.5.

However, for many intended uses, this solution to the problem is not applicable, either because flameproofing agents, such as antimony trioxide or halogenated compounds, are undesirable for toxicological reasons or because the content of organic binder must be high for technical reasons.

DE-A 32 19 792 discloses resin materials which have a high resin content and contain a reaction resin and melamine borate. These materials and the products produced therefrom are only flame-retardant and self-extinguishing if they contain dolomite powder, glass fibres or glass fabric as filler material.

However, the users also require moulding materials, and products produced therefrom, which are sufficiently flameproof, and as far as possible do not continue to burn with glowing combustion when they have a relatively high resin content (up to about 50%) and also readily flammable organic fillers and reinforcing agents, for example synthetic and natural organic fibres.

It was therefore the object of the present invention to provide a flameproof product which is flameproof, resistant to glowing combustion and self-extinguishing and shows very little tendency to continue burning with glowing combustion, even when the resin content is high and even when the said product contains flammable organic filler material. Furthermore, this product should not be poorer than corresponding conventional products in its important physical performance characteristics (for example with regard to its mechanical strength) and should as far as possible release no toxic gases, such as, for example, halogenated compounds, under fire conditions.

This object is achieved by a flameproof product of the type defined at the outset, which is characterised in that the content of the reaction resin is up to 50% by weight and the flameproofing agents form a combination of flameproofing agents which consists of organic borates, salts of phosphoric acids and oxide hydrates of magnesium and/or of aluminium and whose content is 3-35% by weight.

A tested embodiment of this product is characterised in that the combination of flameproofing agents contains 20-60% by weight of organic borates, 15-50% by weight of salts of phosphoric acids and 15-50% by weight of oxide hydrates of magnesium and/or of aluminium, and preferably 35-45% by weight of organic borates, 25-35% by weight of salts of phosphoric acid and 25-35% by weight of oxide hydrates of magnesium and/or of aluminium.

It has been found that such products, even when they contain up to 50% by weight of reaction resin, are flameproof when the reaction resin mixture is in the uncured state as well as in the cured state, provided that the content of the combination of flameproofing agents is 3-35% by weight.

Such products are furthermore resistant to glowing combustion according to the definition of DIN 53,459, or burn with glowing combustion for less than 1 min in the Nordtest NT-Fire 002, or are V0 according to UL 94 (corresponds to IEC 707). Under fire conditions or on contact with hot or glowing surfaces, the products produce an extremely small amount of smoke and no halogen-containing toxic gases. In the cured state, products produced from such mixtures show no deterioration in the important physical properties.

Suitable binders based on a reaction resin are resin/curing agent combinations of thermosetting polymers, such as the aminoplasts, the unsaturated polyester resins, epoxy resins and in particular the phenol resins. The phenol resin/hexamethylenetetramine combinations known per se, as well as self-curing resols in particular solid resols in powder form or pulverulent mixtures of a non-heat-reactive phenol resin and one or more heat-reactive condensates from the group consisting of the phenol, amino or epoxy resins, as described in DE-A-36 25 443, are particularly advantageous.

Useful organic borates are adducts or reaction products of boric acids, in particular with melamine or hexamethylenetetramine, for example melamine borate or hexamethylenetetramine borate or metaborate (hexametaborate).

Salts of phosphoric acids are, for example, phosphates, pyrophosphates, metaphosphates and polyphosphates. In particular, those of ammonium are used. Both monoammonium dihydrogen phosphate and diammonium monohydrogen phosphate or ammonium metaphosphate and ammonium polyphosphates of the general formula $(NH_4PO_3)_n$, wherein n is 20–1000, can be used. Other preferred phosphates are melamine phosphate or melamine pyrophosphate.

For the preparation of the combination of flameproofing agents, either a compound or mixtures of several compounds both from the group consisting of the organic borates and from the group consisting of the phosphates can be mixed with magnesium oxide hydrate or aluminium oxide hydrate or with both oxide hydrates in the ratios described at the outset.

The combination of flameproofing agents is processed with reaction resins, optionally curing agents, additives, fillers and reinforcing agents—for example fibres—in a manner known per se, to give curable moulding materials. However, they can also be used in conjunction with liquid reaction resins, by impregnating paper, nonwovens or woven fabrics for the production of prepregs.

If the mixtures of binder, combination of flameproofing agents and fillers or reinforcing agents are prepared by an intensive mixing process using shearing forces, the various components can be added individually.

In general, however, it is expedient to premix the binder and combination of flameproofing agents and thus prepare a flame-retardant reaction resin mixture which contains 6 to 42.5% of a flameproofing agent combination having the above-mentioned composition.

The use of such flame-retardant reaction resin mixtures which, like a masterbatch in the rubber industry, are distinguished by optimal distribution of the components and prewetting of the combination of flameproofing agents by the binders is particularly advisable in the production of nonwoven textiles or prepregs.

The moulding materials can be further processed to three-dimensional mouldings or sheet-like structures, and the prepregs can be further processed to laminates or mouldings.

The invention is illustrated below by a few examples, from which it can be seen that the products according to the invention have a surprising synergistic effect with regard to the flameproof properties.

EXAMPLES 1-11

For Examples 1-11, sheet-like structures containing textile fibres were produced by mixing digested textile fibres with a conventional reaction resin or a reaction resin containing a flameproofing agent. The mixture according to Example 1 contains no flameproofing agent. The mixtures according to Examples 2-11 all contain at least one flameproofing agent. The mixtures according to Examples 8-11 correspond to the product according to the invention. 8 mm thick nonwovens were formed from the mixtures in a known manner (see also Ullmanns Encyclopädie der technischen Chemie [Ullmanns Encyclopaedia of Industrial Chemistry], 4th edition, Volume 23, pages 733-735, "Vliesstoffe-Herstellungsverfahren" [Nonwovens-Production processes]), the said nonwovens being cured at about 170° C. Test specimens measuring 800×300 mm were cut out from these. These test specimens were tested by the "Nordtest NT Fire 002" as described below, and in addition the time of continued glowing combustion was also measured (see also J. Troitzsch, "Brandverhalten von Kunststoffen" [Fire behaviour of plastics], page 192, Carl Hanser Verlag, Munich, 1982).

For the test, 3 groups of 2 test specimens measuring 800×8 mm were placed vertically and parallel to one another a distance of 50 mm apart, and one test specimen was displaced upwards by 125 mm and its lower edge protected from the flame by an angle iron.

As the ignition source, a Teclu propane burner was installed 25 mm below the protected edge of the upper test specimen, the burner being at right angles to, and 60 mm away from, the lower test specimen.

After the burner had been ignited, the flame was applied to the lower test specimen for 10 minutes. The material was considered to have passed the test if the following criteria were fulfilled:

1. The lower test specimen may burn with flaming combustion during the 10 minutes but must extinguish itself directly after removal of the flame.
2. The upper test specimen, to which the flame is not directly applied, must not burn with flaming combustion during the 10 minutes.
3. After extinguishing of the flame, a subsequent glowing combustion time of 1 minute must not be exceeded.

The composition of the test specimens according to Examples 1-11 and the results of their tests are shown in Table I. Examples 1-7 listed therein are Comparative Examples and Examples 8-11 correspond to products according to the invention.

TABLE I

| (Amounts in kg) | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| Textile fibre | 720 | 650 | 650 | 650 | 650 | 650 | 650 | 650 | 650 | 650 | 650 |
| Phenol novolak | 263 | 263 | 263 | 263 | 263 | 263 | 263 | 263 | — | 263 | 263 |
| Hexamethylenetetramine | 17 | 17 | 17 | 17 | 17 | 17 | 17 | 17 | — | 17 | 17 |
| Novolak/Resol combination | — | — | — | — | — | — | — | — | 280 | — | — |
| Al(OH)$_3$ | — | 70 | — | — | — | 35 | 35 | 21 | 21 | 21 | 21 |
| Monoammonium phosphate | — | — | 70 | — | 35 | — | 35 | 21 | 21 | — | 21 |
| Melamine borate | — | — | — | 70 | 35 | 35 | — | 28 | 28 | 28 | — |
| Ammonium polyphosphate | — | — | — | — | — | — | — | — | — | 21 | — |
| Hexametaborate | — | — | — | — | — | — | — | — | — | — | 28 |
| Subsequent combustion time (in min) | burns completely | 9 | 4 | 8 | 3 | 7 | 3 | 0 | 0 | 0 | 0 |
| Subsequent glowing combustion time (in min) | — | >1 | >1 | >1 | <1 | >1 | >1 | <1 | <1 | <1 | <1 |
| Production of smoke | Pronounced | Pronounced | Pronounced | Pronounced | Pronounced | Pronounced | Pronounced | Slight | Slight | Slight | Slight |

EXAMPLES 12-19

Table II contains examples of test specimens which have different compositions and are produced by mixing the components in a heatable kneader at about 110° C.

Sheets produced from these mixtures and measuring 120 mm in length and width and 4.0 mm in thickness were cured by hot pressing (4 min at 170° C.), and test specimens measuring 120 mm in length, 10.0 mm in width and 4.0 mm in thickness were cut from these.

The test specimens were tested for resistance to glowing combustion and subsequent glowing combustion behaviour-similarly to DIN 53,459. The results of the tests are likewise shown in Table II.

Examples 12-15 listed in Table II are Comparative Examples and Examples 16-19 correspond to products according to the invention.

TABLE II

| (Amounts in kg) | Example No. | | | | | | | |
|---|---|---|---|---|---|---|---|---|
| | 12 | 13 | 14 | 15 | 16 | 17 | 18 | 19 |
| Hexamethylenetetramine | 6.0 | 6.0 | 6.0 | 6.0 | 6.0 | — | — | 6.0 |
| Magnesium stearate | 1.5 | 1.5 | 1.5 | 1.5 | 1.5 | 1.5 | 1.5 | 1.5 |
| Textile chips | 33.5 | 33.5 | 33.5 | 33.5 | 33.5 | 33.5 | 33.5 | 33.5 |
| Chalk | 20.0 | 8.0 | 8.0 | 8.0 | 8.0 | 8.0 | 8.0 | 6.0 |

TABLE II-continued

| (Amounts in kg) | Example No. | | | | | | | |
|---|---|---|---|---|---|---|---|---|
| | 12 | 13 | 14 | 15 | 16 | 17 | 18 | 19 |
| Phenol novolak | 39.0 | 39.0 | 39.0 | 39.0 | 39.0 | — | — | 39.0 |
| Solid resol | — | — | — | — | — | 45.0 | — | — |
| Novolak/Resol combination | — | — | — | — | — | — | 45.0 | — |
| Al(OH)$_3$ | — | 6.0 | 6.0 | — | 3.6 | 3.6 | 3.6 | — |
| Monoammonium phosphate | — | 6.0 | — | 6.0 | 3.6 | 3.6 | 3.6 | 5.6 |
| Melamine borate | — | — | 6.0 | 6.0 | 4.8 | 4.8 | 4.8 | 4.8 |
| Mg(OH)$_2$ | — | — | — | — | — | — | — | 3.6 |
| Visible flame | + | + | + | + | — | — | — | — |
| Subsequent glowing combustion time | 10 min | 40 sec | 20 sec | 10 sec | — | — | — | — |
| Burning distance | 95 mm | 6 mm | 8 mm | 4 mm | — | — | — | — |
| Classification according to DIN 53,459 | 3 b | 2 a | 2 a | 2 a | 1 | 1 | 1 | 1 |

EXAMPLE 20

As a Comparative Example, soda pulp paper was impregnated in a manner known per se by immersion in a 55% solution of a phenol resol in methanol (viscosity: 60–90 mPa.s; B time at 130° C. according to DIN 16916-02-C2: 7.5–8.5 min) and subjected to preliminary reaction in a forced-draught drier at a temperature of 100°–150° C.

The resin content of the paper prepreg was about 45%. Thereafter, several layers of the prepregs thus obtained were placed one on top of the other and pressed at 160° C. in a press for 60 minutes at a pressure of 100 bar. The thickness of the laminate was about 1.6 mm.

Test specimens having dimensions meeting the requirements of the testing specifications for UL 94 (length: 127 mm, width: 12.7 mm, thickness: 1.6 mm) were sawn from the laminate. These test specimens underwent combustion during the test, corresponding to classification in HB according to UL 94.

EXAMPLE 21

As Example 20, a laminate which contained 37.0% by weight of resin, 15.0% by weight of the combination of flameproofing agent (consisting of monoammonium dihydrogen phosphate, aluminium oxide hydrate and melamine borate in a weight ratio of 3:3:4) and 48% by weight of cellulosic fibre material was produced. The test specimens produced from this laminate were classified in V0 in the test according to UL 94.

We claim:

1. A flameproof product containing organic fibres, a reaction resin as a binder and flameproofing agents, wherein the reaction resin is up to 50% by weight and the flameproofing agents comprise a combination of flameproofing agents which consists of organic borates, salts of phosphoric acids and oxide hydrates of metals taken from the group consisting of magnesium, aluminum and mixtures thereof, and whose content is 3–35% by weight; said combination of flameproofing agents comprising 20–60% by weight of organic borates, 15–50% by weight of salts of phosphoric acids and 15–50% by weight of oxide hydrates.

2. Product according to claim 1, wherein the combination of flameproofing agents comprises melamine borate or hexamethylene tetramine metaborate as the organic borate.

3. Product according to claim 1, wherein the reaction resin is a resin/curing agent combination consisting of a phenol resin and hexamethylenetetramine.

4. Product according to claim 1, wherein the reaction resin is a pulverulent or liquid phenol resol.

5. Product according to claim 1, wherein the reaction resin is a pulverulent mixture of a non-heat-reactive phenol resin and one or more heat-reactive condensates taken from the group consisting of phenol, amino or epoxy resins.

6. Product according to claim 5, wherein the reaction resin contains the non-heat-reactive phenol resin and the heat-reactive condensate in a weight ratio of 30:70 to 90:10.

7. Product according to claim 1, further including pigments and additives.

8. Product according to claim 1, wherein the fibre material is at least predominantly an organic fibre material.

9. Product according to claim 8, wherein the organic fibre material is derived from textiles.

10. Product according to claim 1, wherein the fibre material is taken from the group consisting of natural, synthetic, mineral, wood fibres, and mixtures thereof.

11. Product according to claim 1, in the form of a sheet-like structure or a molded product.

12. Product according to claim 1, in the form of a curable material or a molded product.

13. Product according to claim 1, in the form of a laminate.

14. Flame-retardant reaction resin mixture, comprising 6–42.5% of a flameproofing agent combination consisting of organic borates, salts of phosphoric acids and oxide hydrates of metals taken from the group consisting of magnesium, aluminum and mixtures thereof; said combination of flameproofing agents comprising 35–45% by weight organic borates, 25–35% by weight phosphoric acid salts and 25–35% by weight oxide hydrates.

15. Product according to claim 1, wherein the combination of flameproofing agents comprises 35–45% by weight organic borates, 25–35% by weight phosphoric acid salts, 25–35% by weight magnesium oxide hydrates.

16. Product according to claim 1, wherein the combination of flameproofing agents comprises a mixture of aluminum and magnesium hydrates.

17. A flameproof textile product comprising a predominant amount of organic fibres with fillers optionally present, said fibres being bound together with a binder comprising a reaction resin and flameproofing agents, said flameproofing agents comprising 3–35% of the weight of the product and consisting essentially of a mixture of from 20–60% by weight organic borates, from 15–50% by weight phosphates, and from 15–50% metal oxide hydrates.

18. The flameproof product according to claim 17, wherein said reaction resin comprises up to 50% phenolic resin and said metal oxide hydrate is taken from the group consisting of aluminum hydroxide and magnesium hydroxide and mixtures thereof.

19. The flameproof product according to claim 18, wherein said flameproof mixture comprise from 35–45% by weight organic borates, from 25–35% by weight phosphates and from 25–35% by weight metal oxide hydrates.

* * * * *